US005588841A

United States Patent [19]

Mechling

[11] Patent Number: 5,588,841

[45] Date of Patent: Dec. 31, 1996

[54] APPARATUS AND METHOD FOR THE TEACHING OF STANDING BALANCE

[76] Inventor: Richard W. Mechling, 526 St. Charles Ave. NE., Atlanta, Ga. 30308

[21] Appl. No.: 416,639

[22] Filed: Apr. 5, 1995

[51] Int. Cl.[6] ...................... G09B 19/00

[52] U.S. Cl. ...................... 434/255; 434/258; 601/35; 601/34

[58] Field of Search ...................... 434/255, 258, 434/247; 601/33, 34, 35, 5; 602/5, 23

[56] References Cited

U.S. PATENT DOCUMENTS 3,557,782 1/1971 Wafer .................. 602/23

4,229,001 10/1980 Roman .................. 601/34 X 4,795,148 1/1989 Rangaswamy .................. 601/35 X

FOREIGN PATENT DOCUMENTS 2468354 5/1981 France .................. 601/34

*Primary Examiner*—Gene Mancene
*Assistant Examiner*—Jeffrey A. Smith

[57] ABSTRACT

A method and an apparatus for the practice of standing balance. A lower-leg support holds the subject vertical from the knees down, and allows the user to attempt maintaining upright stance as assistance is gradually removed.

5 Claims, 1 Drawing Sheet

APPARATUS AND METHOD FOR THE TEACHING OF STANDING BALANCE

FIELD OF THE INVENTION

The present invention relates generally to instruction of standing balance. The invention relates more specifically to a support which holds the lower legs in the vertical position as the subject practices mail, raining upright stance, and to a method of progressive practice of independent standing.

DESCRIPTION OF THE PRIOR ART

The practice of standing balance is important to many people who are not safe and independent when standing. It is common for this group to have difficulty using well timed muscular action about the tipsy, knees, and ankles so as to apply forces through the feet and on to the ground. These forces can help push the person back to upright after they have started to lean forward or backward. Until a person can press down against the ground with the ball of their foot when they start to sway forward, and raise the ball of the foot from the ground during backward sway, their ability to maintain a safe stable standing position is deminished. Reduced precision in foot and ankle movement can be augmented with bending or straightening at the hips with the sum effect of such compensatory balance movements being that the person's center of gravity does not stray beyond the limits of stable stance. Most paralyzed individuals who cannot maintain standing balance find that they go through either forward or backward way without the use of the above movements to reright themselves. Instead they just continue to fall.

There are many devices which are used to practice control of postural balance in standing which can be used after a person has aquired elementary mastery over maintaining unsupported balance in standing on a firm level surface for several minutes. Examples of such devices include balance disks, balance or rocker boards, and Babst boards. Unfortunately, none of these devices can be used successfully by the person who hopes to develop standing balance, but who can not yet maintain controlled unsupported stance for even five seconds. Such subjects would find these devices far too difficult and the rapid falls during attempted use would not assist in the learning of subskills involved in controlling postural sway in independent standing.

Another category of postural balance aid, which includes walkers, crutches, canes, and pole standers, does provide stability to the subjects in standing so as to avoid falls. These devices allow the subject to use their arm or hand to apply some of the postural gravitational forces to the ground outside of the normal base of support, which is the feet. This effectively gives the user a much larger base of support than is represented by the feet without cane or walker, and thereby circumvents the need of the subject to have precise control over the prior mentioned leg motions. Practice with these devices usually asks the user to develop skill at pushing against hand support during postural leaning so as to gain upright positioning, and therefore does not develop the skilled ankle and hip movements needed for standing without hand support.

Yet another approach to progress the non-standing person toward standing involves propping the person into the standing position with full trunk and/or lower body support. These devices are commonly referred to as prone standers or standing frames, and they allow the subject to experience the gravitational forces of their weight through their feet and skeletal systems. Such devices do not, however, allow the subject free movement of the body over the foot so that the act of controlling postural sway can be practiced and accomplished by the subject.

SUMMARY OF THE INVENTION

The present invention provides a method of use which satisfies the aforementioned needs. The invention provides a support for assisting the practice of standing balance which can be used by those whose degree of paralysis leaves them unable to independently balance in positions higher than hands-and-knees or kneeling. In addition, the present invention provides a method of progressively practicing the coordination needed for independent stance with-these same indivduals.

In the preferred embodiment two soft pads with convexities which can fit the shape of the calf musculature are mounted essentially perpendicular to a platform with brackets such that the subject can comfortably stand with their calves making pad contact. Attached to the platform under the subject's feet are holders with straps which can hold the subject's feet in place. Straps are also attached to the back of the calf pads which can be fastened in front of the subject's tibia or knee to maintain tibial positioning, which is also essentially upright and perpendicular to the platform. The shoe holders and the calf-pad brackets are attached to the platform with bolts which run through slots which run essentially parallel to the length of the platform. These slots allow the calf pads and shoe holders to be moved forward or back relative to each other so that the shoe holders can be fixed in positions not directly under the calf pads. These slots also allow one foot and calf to be advanced in front of the other foot and calf.

This preferred embodiment overcomes many of the shortcomings of the various balance boards in regards to allowing a method of postural balance practice with the balance-impaired population. When the subject is strapped firmly into the perpendicularly oriented shoe holders and calf pads, their upper body is adequately free so they will move through forward and backward sway. Despite this freedom to experience postural sway, the subject has calf and tibial support to slow extreme forward and backward movement as their leg presses against the supports. As the subject's sway is slowed, they have more time to detect loss of posture with their inner ear, visual, and joint position senses. This will in turn give more time for them to respond with their imprecise postural recovery movements. This additional time allows the subject to use their various coordination patterns in trial-and-error as they explore which movements will regain and retain stance.

Using this preferred embodiment, a method of progressing from success n maintaining upright stance with firm tibial support can be accomplished. Successful standing is followed by loosening the straps so that somewhat faster sway and further sway can be reacted to with the coordination learned at the previous support levels. Further postural control progressions within this method can include lowering of the straps so they hold the tibia further below the knee, moving the calf pad forward or backward relative to its matching shoe-holder to align the subject in a forward or backward lean, moving only one set of shoe holders and calf pads forward to require one foot be moved in front of the other, or supporting only one foot and tibia in a subject with one-sided impairment.

Various ancillary attachements can be added to this standing system to improve its safety or effectiveness with a given subject. A chair can be attached to the platform behind the calf supports to allow sitting when fatigued or out of balance. Safety can be enhanced with rails surrounding the user and with a safety chest harness which can be attached to outside support. Safety rails can be moved closer to the leg supports so as to make contact with the subject during sway to help cue them as to their degree of upright positioning.

Accordingly it is the object of the present invention to provide an improved standing support for allowing the progressive practice of independent standing of the balance-impaired subject.

It is another object of the present invention to provide a method for practicing standing balance for the subject who cannot maintain independent stance.

It is another object of the present invention to provide a method of progressing a subject through decreasing levels of tibial support and calf support during standing.

It is another object of the present invention to provide tibial support and assisted foot placement as needed for the balance impaired subject to practice coordination involved in standing balance.

DETAILED DESCRIPTION OF THE PREFERRED EMBODIMENT

Figure 1:
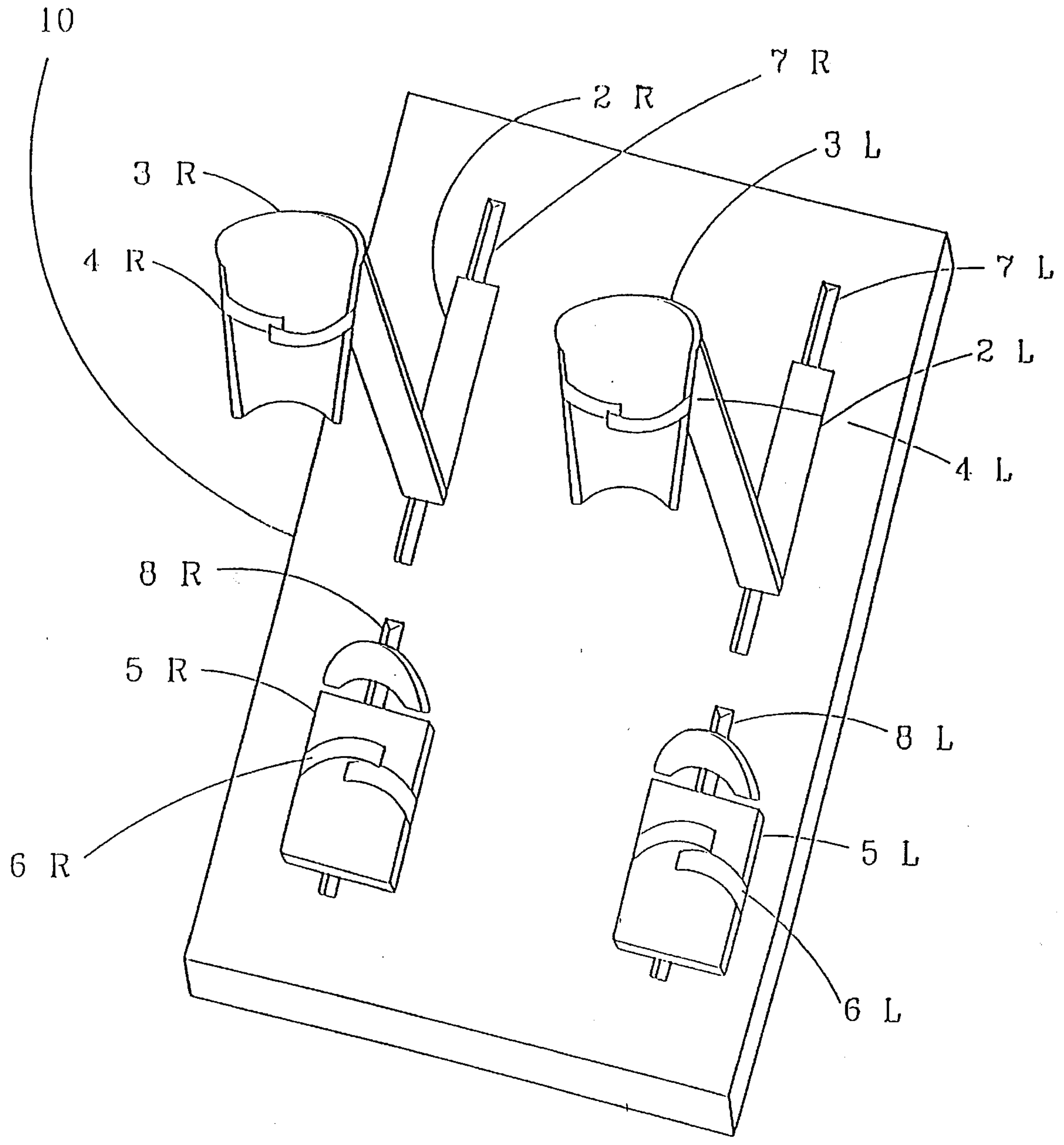
FIG. 1 is a perspective view of a preferred embodiment of the present invention.

Referring now to tile drawing, in which like numbers indicate elements throughout, FIG. 1 shows a preferred embodiment of a lower-leg standing support constructed in accordance with the present invention.

The lower-leg standing support 10 comprises a platform 1 to which are attached right and left L-shaped brackets 2R and 2L, respectively. Right and left calf supports 3R and 3L, respectively, are attached to the ends of right and left L-shaped brackets 2R and 2L, respectively. Right and left calf-support straps 4R and 4L, respectively, are attached to the back of calf supports 3R and 3L, respectively, and are of such a length that they can be connected in front of the right and left calf supports 3R and 3L, respectively, and firmly hold the subject's tibias and calves close to the calf supports 3R and 3L. Right and left shoe holders 5R and 5L, respectively, are attached to the platform 1 beneath the right and left calf supports 3R and 3L, respectively. Right and left foot straps 6R and 6L, respectively, are attached to right and left shoe holders 5R and 5L, respectively, and can be connected over the subject's feet in order to maintain positioning within right and left shoe holders 5R and 5L, respectively. The attachment of right and left L-brackets 2R and 2L, respectively, to the platform 1 are through right and left L-bracket slots 7R and 7L, respectively, which allow right and left L-brackets 2R and 2L to be moved on platform 1. The attachment of right and left shoe holders 5R and 5L, respectively, are through right and left shoe-holder slots 8R and 8L, respectively, which allow right and left shoe holders 5R and 5L to be moved on the platform 1.

It will be understood that right and left calf supports 3R and 3L can be moved along right and left L-bracket slots 7R and 7L, and that right and left shoe holders 5R and 5L can be moved along right and left shoe-holder slots 8R and 8L in order to alter the alignment of one foot to its calf. Changing the foot-to-calf angle will be understood to effect the forward or backward leaning of the subject.

It will be understood that movement of either right or left shoe holder 5R or 5L along with its matching right or left calf support 3R or 3L toward the front of the platform I will leave the moved calf support 3R or 3L and the moved shoe holder 5R or 5L in a relatively advanced position in comparison to the non-moved shoe holder 5R or 51 and the non-moved calf, support 3R or 3L.

The simplest use of the lower-leg standing support 10 includes placing a subject in a standing position with their calves held firmly by the calf-support, straps 4R and 4L against the calf supports 3R and 3L and with their feet strapped by right and left foot straps 6R and 6L such that their tibia and calves are relatively perpendicular to the platform 1. After the subject gains skill at maintaining stance with this degree of support, the calf-support straps 4R and 4L can be loosened a chosen amount for further practice. Continued practice can lead to further loosening of calf-support straps 4R and 4L and can lead to movement of one calf support 3R or 3L and one shoe holder 5R or 5L in front of the remaining calf support 3R or 3L and the remaining shoe holder 5R or 5L.

The preferred embodiment of the present invention has been disclosed by way of example, and it will be understood that other modifications may occur by those skilled in the art without departing from the scope and the spirit of the appended claims.

I claim:

1. A method of teaching the skill of standing balance, comprising the steps of:

(a) providing lower-leg support to allow maintenance of a relatively vertical tibial and calf position;

(b) providing foot support to allow maintenance of foot position relative to said lower-leg support;

(c) situating a subject in a standing position with lower legs and feet supported by said lower-leg support and said foot support, respectively;

(d) selecting a degree of calf and tibial movement relative to vertical to be allowed by said lower-leg support and;

(e) allowing the subject to attempt to perform standing balance with said foot position and with said allowed degree of tibial and calf movement relative to vertical.

2. The method of claim 1, wherein said allowed degree of tibial and calf movement relative to vertical is an initial predetermined degree of movement, and further comprising the steps of increasing said allowed degree of tibial and calf movement relative to vertical to provide a greater second degree of tibial and calf movement for a subject demonstrating improved balance skill.

3. The method of claim 1 wherein only one foot and lower leg are supported by said foot support and said lower-leg support, respectively.

4. A method of teaching the skill of standing balance, comprising the steps of:

(a) providing two lower-leg supports to allow maintenance of a relatively vertical tibial and calf positioning;

(b) providing two foot supports to allow maintenance of foot positioning relative to said tibial and calf positioning;

(c) selecting a degree to which one of said lower-leg supports and one of said foot supports is to be advanced in front of the other of said foot supports and the other of said lower-leg supports, respectively;

(d) situating a subject in a standing position with their lower legs and feet supported by said lower-leg supports and said foot supports, respectively and;

(e) allowing the subject to attempt to perform standing balance with said degree of advancement of one of said foot supports and one of said lower-leg supports relative to the other of said foot supports and the other of said lower-leg supports, respectively.

5. An apparatus for the instruction of human standing balance, comprising:

(a) a base;

(b) means for support of lower-leg position connected to said base to provide assistance in maintaining upright stance;

(c) means for foot support connected to said base to provide maintenance of foot position;

(c) means for moving said lower-leg support relatively closer to or further from the front of said base along a horizontal plane;

(d) means for moving said foot support relatively closer to or further from the front of said base along the horizontal plane;

(e) means for moving said lower-leg support relative to said foot support along the horizontal plane.

* * * * *